United States Patent [19]
McGrath et al.

[11] Patent Number: 6,008,299
[45] Date of Patent: *Dec. 28, 1999

[54] OPTIC DEVICES FORMED FROM MELT PROCESSABLE THERMOPLASTIC MATERIALS HAVING A HIGH REFRACTIVE INDEX

[75] Inventors: James E. McGrath, Blacksburg; Venkateshwaran N. Sekharipuram, Roanoke, both of Va.

[73] Assignees: Innotech, Inc., Johnson & Johnson Vision Care, Roanoke; Virginia Tech Intellectual Properties, Inc., Blacksburg, both of Va.

[*] Notice: This patent issued on a continued prosecution application filed under 37 CFR 1.53(d), and is subject to the twenty year patent term provisions of 35 U.S.C. 154(a)(2).

[21] Appl. No.: 08/912,117

[22] Filed: Aug. 15, 1997

[51] Int. Cl.$^6$ .............................. C08F 275/00; G02C 7/02
[52] U.S. Cl. .................. 525/255; 525/191; 525/196; 525/200; 525/212; 351/177
[58] Field of Search .................... 525/255, 191, 525/196, 200, 212; 351/177

[56] References Cited

U.S. PATENT DOCUMENTS

| | | |
|---|---|---|
| 4,108,837 | 8/1978 | Johnson et al. . |
| 4,175,175 | 11/1979 | Johnson et al. . |
| 4,492,805 | 1/1985 | Besecke et al. . |
| 4,745,225 | 5/1988 | Ude et al. . |
| 5,079,333 | 1/1992 | McGrath et al. . |
| 5,143,988 | 9/1992 | Wang et al. . |
| 5,387,629 | 2/1995 | McGrath et al. . |
| 5,407,528 | 4/1995 | McGrath et al. . |
| 5,691,442 | 11/1997 | Unroe et al. . |

OTHER PUBLICATIONS

128: 141137 "Cyclic (Arylene Ether" Oligomers Containing the Phenylphosphine Oxide Moiety "Ding et al".
127: 307748 Synthesis and Characterization of Flame Resistant Poly (Arylene Ether) "Riley et al".
120: 324,365 "The Radiation Chemistry of . . . Oxides" "Hill et al".
118: 103350 "Unique Characteristics . . . Oxides" "Smith et al".
114: 247887 "Poly (Arylene Ether) Phosphine Oxide Thermoplastic Materials for Potential Electronic Application" "Smith et al".
114: 82663 "Synthesis and Characterization of Poly (Arylene Ether Phosphine Oxides" "Smith et al".
Chem Abstract: 115: 234048 High Refractive Index Hybrid Ceramer Materials Prepared from Ti(OPr)$_4$ and Poly(Arylene Ether Phosphine Oxide) Through sol–gel Processing "Wang et al".

*Primary Examiner*—Duc Truong
*Attorney, Agent, or Firm*—Reed, Smith, Shaw & McClay, LLP

[57] ABSTRACT

This invention relates generally to optic devices such as ophthalmic lenses, lens blanks, and lens preforms, made from a thermoplastic material of a specific formula and a process for forming the same.

15 Claims, No Drawings

OPTIC DEVICES FORMED FROM MELT PROCESSABLE THERMOPLASTIC MATERIALS HAVING A HIGH REFRACTIVE INDEX

FIELD OF THE INVENTION

This invention relates generally to optic devices such as lenses, (monofocal and multifocal), progressive lenses, lens blanks, and lens preforms.

BACKGROUND OF THE INVENTION

Lenses formed from thermoplastic material have enjoyed increasing popularity. Advances in the production of such lenses have included the use of materials that are lighter and free of unwanted color.

An attractive and important way to optimize a plastic lens is by use of materials having a high index of refraction. This enables lens designers to design thinner lenses having surfaces with larger radii of curvature.

Aromatic thermoplastics have been recognized as potential candidates for the fabrication of high refractive index materials for optical applications, particularly in the area of spectacle wear. Aromatic polycarbonates typify this approach to optical applications, and have an index of refraction of about 1.59. These materials are however known to be subject to undersirable chromatic aberration.

Aromatic polyethers that contain the triphenyl phosphine oxide moiety in the repeat unit have been described in the literature. Aromatic polyethers containing the phosphine oxide group are shown or suggested and described in U.S. Pat. Nos. 4,108,837 and 4,175,175. Some work has been attempted on the use of these materials as short range optical fibers, and as plasma-resistant coatings.

These materials may be synthesized by the reaction of a variety of bisphenols with 4,4'-bis(fluorophenyl) phenyl phosphine oxide (BFPPO) in the presence of a base such as potassium carbonate in dipolar aprotic solvents such as N-methyl pyrrollidinone (NMP) or N,N-dimethyl acetamide (DMAC). Techniques for the synthesis of these compounds are known and many of their physical properties are well documented in the literature. See, for example, C. D., Smith, et al, SAMPE Symps Exib. Vol. 35, No. 1, pp 108–22 (1990); R. L. Holzberlein, et al, Polymer Prepr., Vol. 30, No. 1 p. 293 (1989); D. B. Priddy, et al, Polymer Prepr., Vol. 34, No. 1, pp. 310–11 (1993); D. B. Priddy et al, Polymer Prepr. Vol. 33, No. 2, pp. 231–32 (1992); C. D. Smith, et al., Polymer Prepr., Vol. 32, No. 1, pp. 93–5 (1991); C. D. Smith, et al, High Perform. Polymers, Vol. 3, No. 4, pp. 211–29 (1991). Controlled molecular weight with non-reactive end-groups may be generated, for example, by employing a monofunctional monomer such as 4,tert-butyl phenol.

SUMMARY OF THE INVENTION

The present invention relates to optic devices formed from phosphine oxide containing aromatic polyethers and copolymers with non-reactive end-groups. These controlled molecular weight polyethers demonstrate good mechanical properties as well as favorable optical properties such as a refractive index of at least 1.63, good clarity, and light color. These are critical to the development of good quality, thin and lightweight ophthalmic lenses. Optic devices made from these materials are also less subject to chromatic aberrations.

Non-reactive chain ends are believed to help maintain stable melt viscosity during the processing operation, and to ensure that there is no change in melt viscosity due to chain extension or branching during processing, which also leads to loss of optical properties. The superior thermo-mechanical stability of these materials permit them to be processed at fairly high temperatures without thermal and mechanical degradation.

DETAILED DESCRIPTION OF THE INVENTION

The aromatic polyethers that contain the phosphine oxide moiety in the backbone of the polymer chain possess the critical properties for their successful application in the area of ophthalmic lenses for spectacle eye-wear. The presence of the phosphine oxide moiety in the backbone of the polymer chain contributes to higher refractive index as well as improved thermal and mechanical properties. These materials demonstrate high glass transition temperatures in the range 200–225° C. and therefore have to be processed at elevated temperatures such as 325–350° C. The mechanical properties of these materials indicate that they are tough, ductile and yet glassy materials under ambient conditions and therefore facilitate the generation of thin lenses that possess good impact resistance.

A properly end capped, non-reactive phosphine oxide containing aromatic polyether is described as Formula I below:

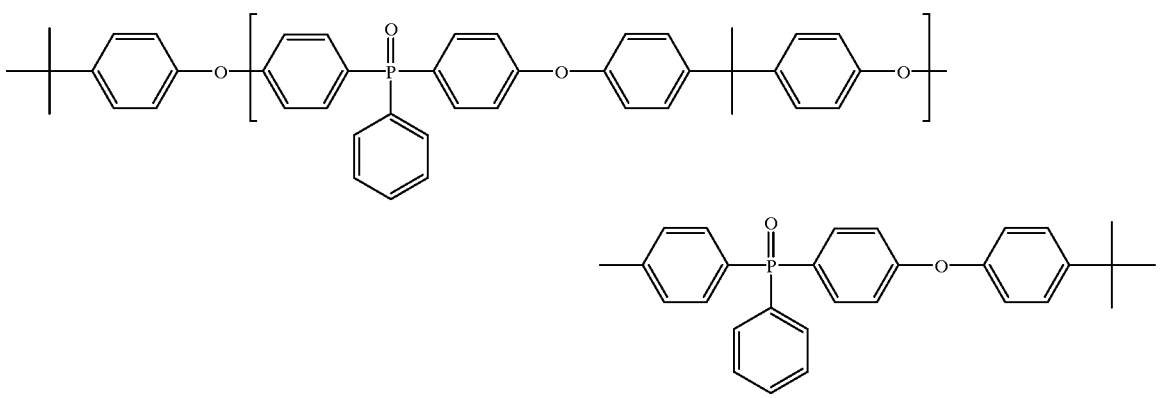

where n=20 to 200, preferably 30–70.

The polymer may be formed by reacting BFPPO, bisphenol A and a 4,-tert butyl phenol, shown below, under the conditions described Example 1.

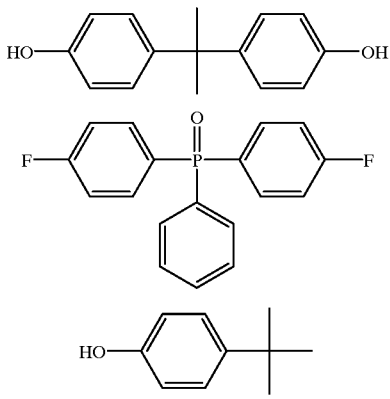

Other homopolymers may be generated by employing a variety of bisphenols instead of Bisphenol 'A' such as hydroquinone, biphenol, 4,4'-oxy diphenol or bis(4-hydroxy phenyl) sulfone.

A number of polyether copolymers may be envisaged by substituting part of the phosphine oxide monomer with either 4,4'dichloro diphenyl sulfone or 4,4' difluoro benzophenone. The general structure of such copolymers may be shown as follows:

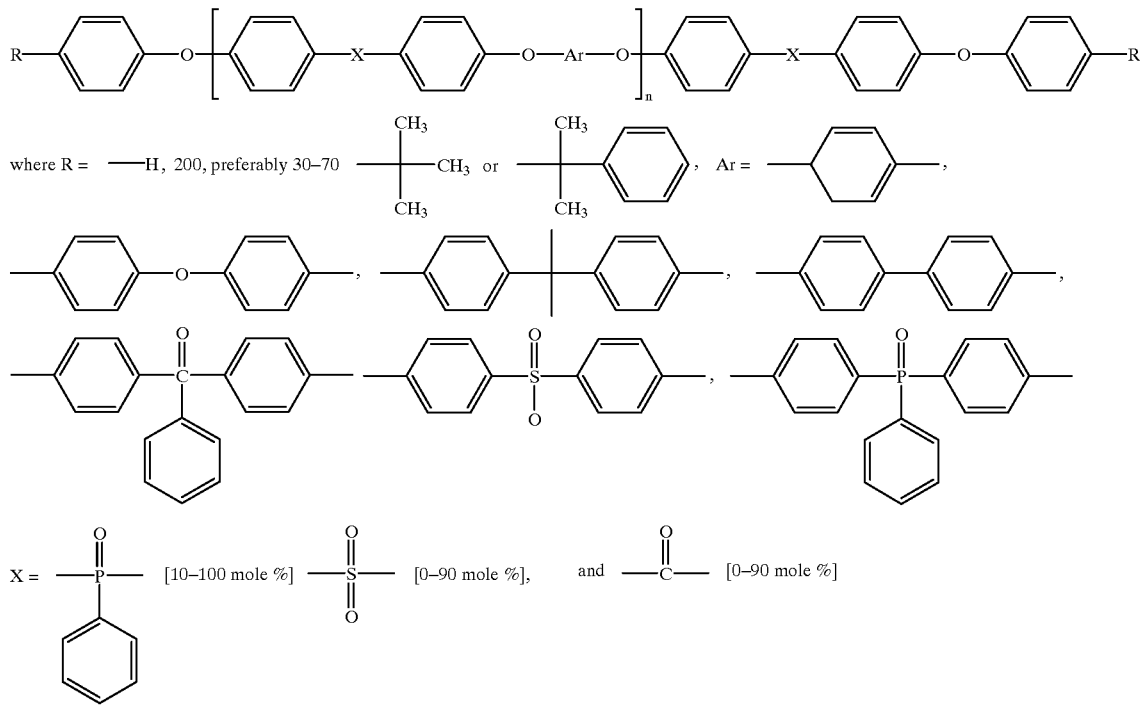

However, anhydrous morphologies must be maintained. Optic devices fabricated from these materials are optically clear, and thinner at their edges than conventional ophthalmic plastic lenses owing to their higher refractive index values.

EXAMPLE 1 (Preparation of Polymer)

31.43 grams, (0.1 moles) of 4,4'-bis(fluorophenyl) phenyl phosphine oxide (BFPPO) [Mol. Wt.=314.2706] along with 22.25 grams (0.098 moles) of bisphenol 'A' [Mol. Wt.= 228.2902] along with 0.70 (0.005 moles) of 4-tert.butyl phenol [Mol. Wt.=138.209] were charged into the 4-necked reaction flask fitted with a bubble tube for argon, an overhead mechanical stirrer and a Dean-Stark trap connected to a reflux condenser. The reactants were dissolved in enough DMAC to make up a 30% solution by weight in a mixture of DMAC and chlorobenzene (80:20). The chlorobenzene served to function as an azeotroping solvent to efficiently remove the water of the condensation reaction as it was formed during the polymerization. The reaction was initially held at 135–140° for 4 hours till the water of condensation was completely distilled off. Subsequently, the reaction temperature was gradually raised to about 165° C. and held there for an additional 16 hours. The reaction product was then allowed to cool down to room temperature and filtered to remove the inorganic salts and neutralized with glacial acetic acid and isolated by precipitation into rapidly agitated methanol/water mixture in a high speed blender. The precipitate polymer was then filtered and dried in a vacuum oven at about 200° C. overnight after being washed repeatedly with methanol to remove all traces of solvent.

The preferred range of number average molecular weight for these polymers is approximately 15,000–25,000 g/mol. At above a number average molecular weight of 25,000 g/mol., the melt viscosity may be too high for rapid processing. Polymers have therefore been synthesized with a targeted molecular weight of 20,000 g/mol. It is known from the literature that the polymer chain length, and thus the molecular weight, of the polymer can be adjusted by controlling the ratio of phosphine oxide to aryl moieties used in the synthesis process.

EXAMPLE 2 (Formation of Lens)

A single vision lens of diameter 80 mms. with a refractice index of 1.66, a spherical power of −6.00 D at a center thickness of 1.0 mm is made of the polymer of Example 1 by processing the polymer melt through an extruder and then forming a lens from the heated extrudate in a conventional injection molding apparatus. The edge thickness for such a lens is 8.8 mms.

A corresponding high index lens made of polycarbonate having a refractive index of 1.58 under the same set of parameters (i.e. center thickness of 1.0 mm, spherical power of −6.00 D, and lens diameter 80 mms.) would have an edge thickness of 10.0 mm.

The foregoing non-limiting example is provided as an illustration. The scope of the present invention is defined only by the following claims.

We claim:

1. An ophthalmic lens, lens blank, or lens preform comprising a thermoplastic material of the formula:

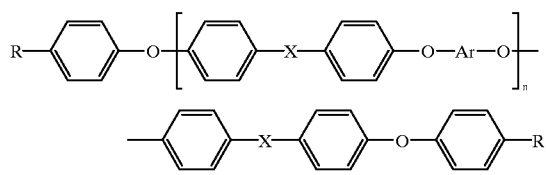

wherein $n$ = 20 to 200, R is hydrogen,

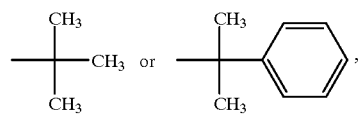

Ar is

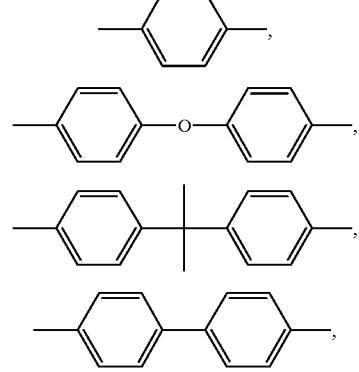

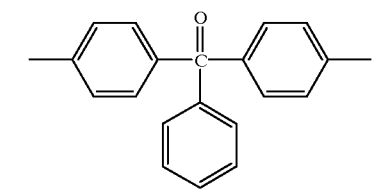

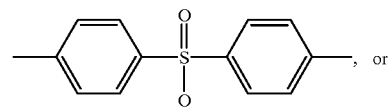

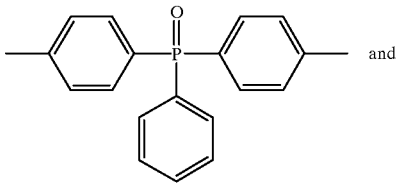

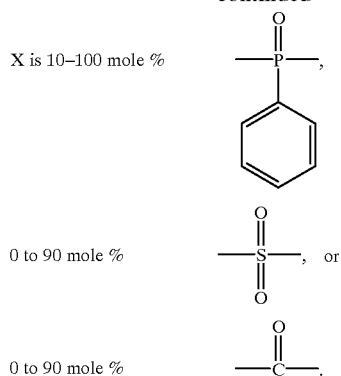

X is 10–100 mole %

0 to 90 mole %

0 to 90 mole %

2. The ophthalmic lens, lens blank, or lens preform of claim 1, wherein the molecular weight of the polymer is from about 15,000 to about 25,000.

3. The ophthalmic lens, lens blank, or lens preform of claim 1, wherein the molecular weight of the polymer is about 20,000.

4. The ophthalmic lens, lens blank, or lens preform of claim 1 wherein the thermoplastic material is of the formula:

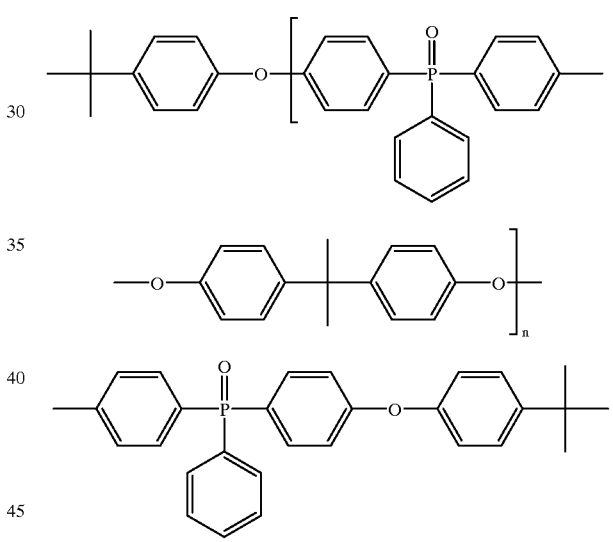

wherein n=30 to 70.

5. The ophthalmic lens of claims 1, 2, 3, or 4, wherein the lens is a spectacle lens.

6. The ophthalmic lens, lens blank, or lens preform of claims 1, 2, 3, or 4, wherein the lens blank is a spectacle lens blank.

7. The ophthalmic lens, lens blank, or lens preform of claims 1, 2, 3, or 4, wherein the lens preform is a spectacle lens preform.

8. The ophthalmic lens, lens blank, or lens preform of claims 1, 2, 3, or 4, wherein the lens is a progressive spectacle lens.

9. The ophthalmic lens, lens blank, or lens preform of claims 1, 2, 3, or 4, wherein the lens is a bifocal spectacle lens.

10. A process for forming an ophthalmic lens, lens blank, or lens preform comprising the step of polymerizing a phosphine oxide moiety and a cyclic aryl moiety, a bicyclic aryl moiety, or mixtures thereof said polymer comprising a thermoplastic material.

11. The process of claim 10, wherein the aryl moiety is a mixture of bisphenol and butyl phenol.

12. The process of claim 10 or 11, wherein the lens is a spectacle lens.

13. The process of claim 10 or 11, wherein the lens blank is a spectacle lens blank.

14. The process of claim 10 or 11, wherein the lens preform is a spectacle lens preform.

15. The process of claim 12 wherein the spectacle lens is a progressive lens.

* * * * *